US006433786B1

(12) United States Patent
Jones, Jr.

(10) Patent No.: US 6,433,786 B1
(45) Date of Patent: Aug. 13, 2002

(54) MEMORY ARCHITECTURE FOR VIDEO GRAPHICS ENVIRONMENT

(75) Inventor: Morris E. Jones, Jr., Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/330,261

(22) Filed: Jun. 10, 1999

(51) Int. Cl.[7] ........................ G06F 15/167; G06F 13/00
(52) U.S. Cl. ........................ 345/544; 345/537; 345/557
(58) Field of Search ................................ 345/520, 531, 345/537–8, 554–7, 564, 558

(56) References Cited

U.S. PATENT DOCUMENTS 4,737,772 A 4/1988 Nishi et al. ................. 340/703
4,890,100 A 12/1989 Kurakakae et al. ......... 340/799
5,065,346 A 11/1991 Kawai et al. ............... 395/128
5,893,158 A 4/1999 Furuta ........................ 711/150
5,999,478 A * 12/1999 Proebsting ............. 365/230.05
6,035,365 A * 3/2000 Farmwald et al. .......... 710/129
6,173,356 B1 * 1/2001 Rao ............................. 711/5

* cited by examiner

*Primary Examiner*—Ulka Chauhan
(74) *Attorney, Agent, or Firm*—Thelen Reid & Priest LLP; John P. Schaub

(57) ABSTRACT

A memory architecture for a video graphics controller includes a dynamic random access memory (DRAM), a static random access memory (SRAM) and a bus. The DRAM includes a data port, an address decoder that can receive an address to select a memory location in the DRAM and a command instruction bus that can receive instructions for data transfer. The SRAM includes a first data port to transfer data with the DRAM, a second data port to transfer data with other than the DRAM, a first address decoder that can receive an address to select a memory location in the SRAM for data transfer with the DRAM, a first read/write input that can receive a signal for data transfer with the DRAM, a second address decoder that can receive an address to select a memory location in a page of the SRAM to transfer data with other than the DRAM and a second read/write input that can receive a signal for data transfer from other than the DRAM. The bus is coupled between the data port of the DRAM and the first data port of the SRAM for data transfer between the DRAM and the SRAM.

15 Claims, 2 Drawing Sheets

MEMORY ARCHITECTURE FOR VIDEO GRAPHICS ENVIRONMENT

BACKGROUND OF THE INVENTION

1. Field of the Invention

The present invention relates to memory architecture for a video graphics environment. More particularly, the present invention relates to a memory architecture that includes a dynamic random access memory (DRAM) and a dual ported static random access memory (SRAM) coupled by a page wide bus. This memory architecture improves the efficiency of employing a DRAM as a video memory in a video graphics environment.

2. The Prior Art

The on screen resolution of the video provided by video graphics cards has been increasing in performance at a tremendous rate. Much of this increase has been based on the improvements of the video graphics controller in the video graphics card. Unfortunately, the access time required by the memory devices, usually DRAMS, used by the video graphics controllers have not kept pace with the increased performance of video graphics controllers. Presently, the gap between video graphics controller performance and DRAM access time continues to widen. There are several reasons for this widening gap.

A DRAM is an integrated circuit wherein typically an array of memory cells are arranged in rows and columns. For example, a 4 megabyte DRAM has memory cells arranged in a square matrix of 2048 rows by 2048 columns. Each of the memory cells stores a bit of information by the presence or absence of an electrical charge on a capacitor. In a DRAM, "refresh" circuitry is provided for restoring to full charge a capacitor that has been partially discharged.

In many applications, DRAMs, known as page mode DRAMs have been employed wherein the requestor of the data can use all of the data in an entire page at one time. When the data is sought by data requestors in the video graphics controller, however, this is typically not the case. In a video graphics environment, the memory sequencer receives data I/O requests from various data requesters, determines the priority of data I/O access among the data requesters, and obtains the data from the DRAM accordingly. Typically, each of the requesters only a few bytes of data at a time. For example, a first data requestor will want a few bytes of data, and then another data requestor will want a few bytes of data, and then a third requestor will want a few bytes of data,etc. As a result, even though an entire page can be read from the DRAM in page mode, only a few bytes of data will be used from each memory cycle.

One approach to utilize the page mode capabilities of a DRAM in a video graphics environment is to read the DRAM contents into a memory cache. As is well understood by those of ordinary skill in the art, a cache memory is organized and addressed with tags to identify the portions of the DRAM memory which the cache memory represents. When the requested data is within the cache memory, this is called a cache hit. When the data sought is not within the cache memory, this is called a cache miss. When a cache miss is made, the requested data must then be retrieved from the main DRAM memory. Different organizational approaches of the cache memory include direct mapped cache, full-associative cache, and set associative cache. The particular organization of the cache memory and the tags employed depends largely on system for which the cache memory is being employed.

The cache memory is employed to improve the efficiency in the use of the page mode DRAM in a video graphics environment on the assumption that despite the fact that the data requestors may request only a few bytes of data at a time, the data in the cache memory will be the few bytes of data in the main memory that is more frequently accessed than other data. Employing a cache memory, however, has the drawbacks of overhead of cache organization, addressing tags, and a slow memory retrieve from the main DRAM memory when there is a cache memory miss.

Further, employing a cache memory in a video graphics environment to improve the efficiency in the use of a page mode DRAM does not contemplate or appreciate that the bytes of data requested by some the data requesters are not simply the same bytes of data being used repeatedly, but that the linear order of the bytes being used are essentially predictable. Because of this linear predictability, there is room for improving the efficiency of using a page mode DRAM in a video graphics environment by taking into account the linear predictability of the data being used by the data requestors.

SUMMARY

A memory architecture for a video graphics controller includes a dynamic random access memory (DRAM), a static random access memory (SRAM) and a bus. The DRAM includes a data port, an address decoder that can receive an address to select a memory location in the DRAM and a command instruction bus that can receive instructions for data transfer. The SRAM includes a first data port to transfer data with the DRAM, a second data port to transfer data with other than the DRAM, a first address decoder that can receive an address to select a memory location in the SRAM for data transfer with the DRAM, a first read/write input that can receive a signal for data transfer with the DRAM, a second address decoder that can receive an address to select a memory location in a page of the SRAM to transfer data with other than the DRAM and a second read/write input that can receive a signal for data transfer from other than the DRAM. The bus is coupled between the data port of the DRAM and the first data port of the SRAM for data transfer between the DRAM and the SRAM.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

Figure 1:
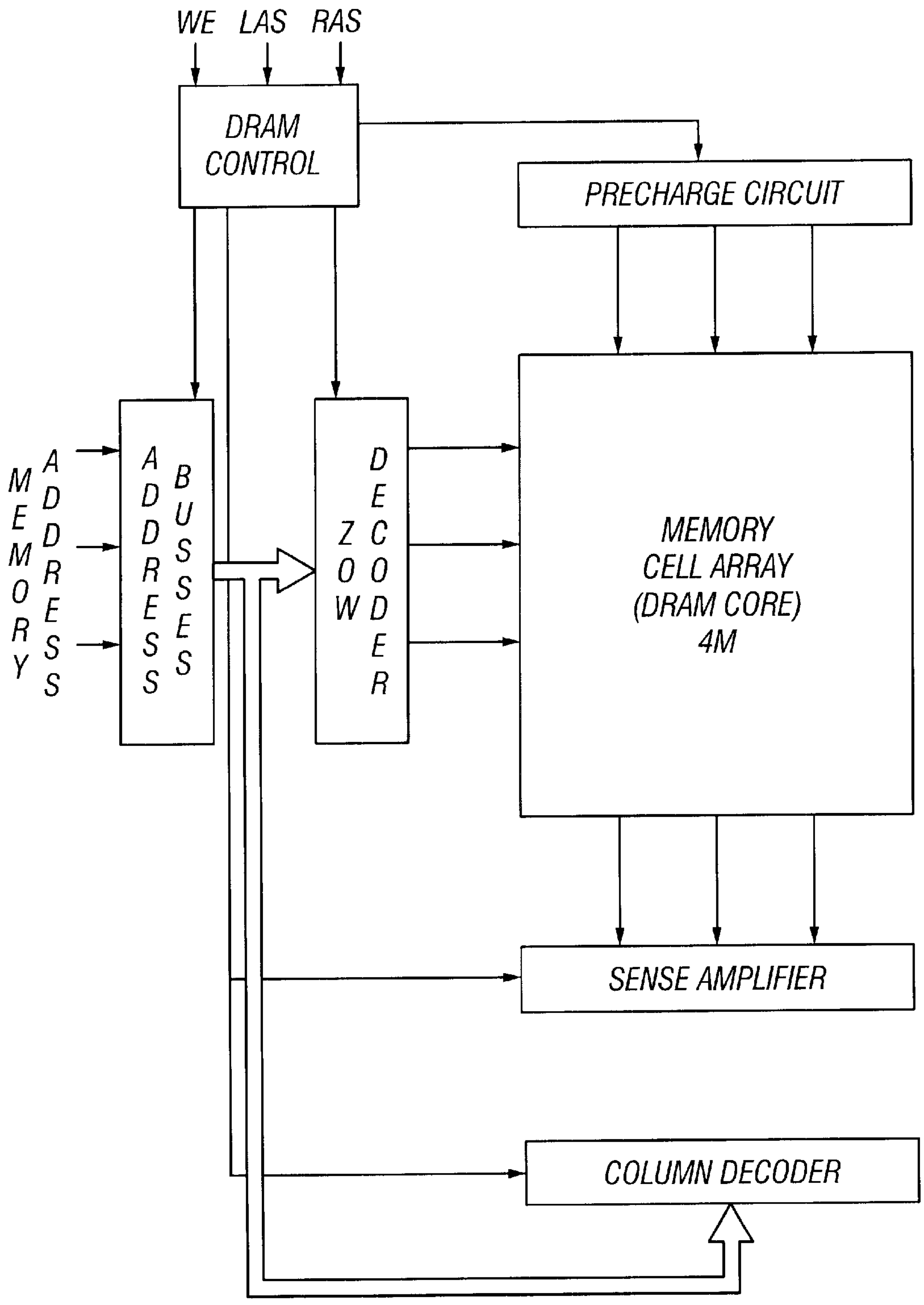
FIG. 1 is a block diagram of a typical DRAM memory including a DRAM core and associated peripheral circuits.

A typical DRAM core with peripheral circuits such as row and column decoders, precharge circuitry, and sense amplifiers is illustrated in FIG. 1.

In a video graphics environment, a memory sequencer (DRAM controller) provides data I/O access to the DRAM for various circuits in a video graphics controller, typically termed data requesters. Access to a particular memory cell is obtained with a two-part address, wherein a first part of the address indicates the row of the memory cell, and a second part of the address indicates a column of the memory cell. The memory sequencer provides control signals such as active low column address strobe ($\overline{CAS}$), active low row address strobe ($\overline{RAS}$), and write enable (WE) to the DRAM to multiplex or sequentially strobe the row address and column addresses into an address buffer of the memory device.

Generally, the address buffer reads the row address, and the ($\overline{RAS}$) strobes the row address into the row address decoder. Next, the address buffer reads the column address, and the ($\overline{CAS}$) strobes the column address into the column address decoder. the row address signalled by the RAS, then the column address signalled by the CAS. The control signals presented to the memory system must be presented in a precisely timed manner in accordance with the timing requirements of the memory system for control of sequential accesses to the DRAM by the memory sequencer.

Such timing requirements include the precharge time, the RAS access time, and the CAS access time. For example, once a memory access has been completed and before the next row address can be decoded, the bit lines in the DRAM must be pre-charged and equalized so the values in the capacitors in the DRAM can be reliably sensed. The length of time it takes to precharge these bit lines is commonly referred to as the RAS precharge time.

After the process of precharging and equalizing is finished, the row address is decoded and the capacitor values sensed, and then the column address is decoded and the data is output. The length of time it takes to decode both the row and column address and output data is commonly referred to as the RAS access time or simply access time. The amount of time from the decode of the column address to the output of data is typically referred to as the CAS access time. The CAS access time is typically much shorter than the RAS access time. The RAS precharge time and the access time are generally referred to as the cycle time. For example, once the memory sequencer accesses the DRAM to perform a read, the memory sequencer must wait until the cycle time has elapsed before it can access the DRAM again.

To avoid the slow access problem, page mode DRAMs and other methods of accessing a DRAM were developed to provide faster operations within a row address defined page boundary. In page mode, unlike normal DRAM operation wherein the RAS and CAS signals both make a transition from low to high for data output, the RAS signal is held low and new column addresses along with the assertion of the $\overline{CAS}$ signal are input to the DRAM. In this manner, the bit line charge and the row address decode only take place once for each page of data output. Since the time to perform the column address decode is typically less than either the precharge or row address decode time, the average access time per byte of data is significantly reduced.

Figure 2:
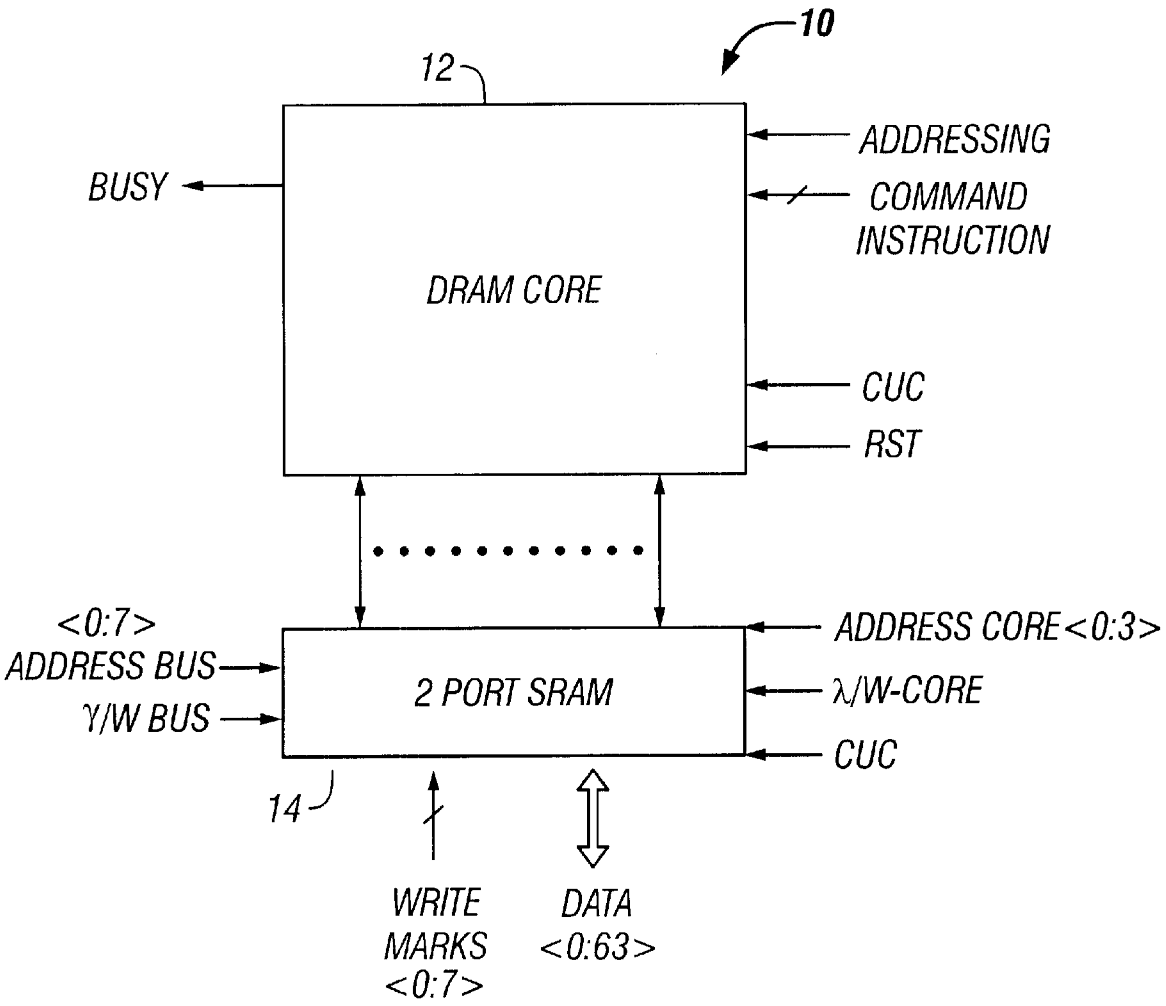
FIG. 2 is a block diagram of the DRAM core and dual ported SRAM architecture according to the present invention.

In FIG. 2 a memory architecture 10 according to the present invention is illustrated. The memory architecture includes a DRAM core 12 and a dual ported SRAM 14 coupled by a bus having a width that can accommodate a page of data from the DRAM core 12 in a single transfer. The DRAM core 12 is preferably 4M having a page wide row of 1K bits, and the SRAM 14 is preferably sixteen pages 1K bits. The circuit designs of the DRAM core 12 and dual ported SRAM 14 suitable for use according to the present invention are well within the level of skill of those of ordinary skill in the art and will not be described herein to avoid overcomplicating the disclosure and thereby obscuring the present invention.

According to the present invention, data to be used by data requesters in a video graphics environment is stored in the page wide DRAM core 14 and loaded into the SRAM 14 a page at a time. The SRAM 14 is partitioned so that separate portions of the memory space are allocated to separate ones of the data requestors. This provides a very distinct advantage over a cache memory because the overhead associated with cache tags is not required. The memory sequencer simply addresses the predetermined location in the SRAM 14 that has been assigned to a particular data requestor. Because the data requirements of certain data requestors is linearly predictable, the data in the preassigned SRAM 14 location will be present as expected.

Once a page of data has been loaded in the SRAM 14 for the DRAM core 12, the memory sequencer, which controls access to the memory architecture 10 by the data requestors, typically will only need to access the SRAM 14 for requested data, instead of the slower DRAM core 14. By recognizing that the data required by certain of the data requestors is linearly predictable, greater efficiency is achieved for the page mode operation of the DRAM core 12.

Figure 3:
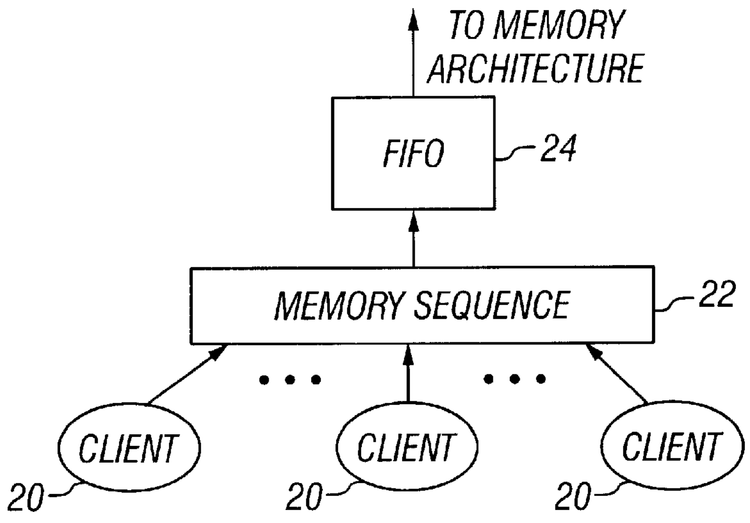
FIG. 3 is a block diagram of generalized architecture of a memory sequencer and the clients of the memory sequencer for utilizing the memory architecture depicted in FIG. 2.

In FIG. 3, a block diagram of a generalized architecture for the data requestors 20 or "clients" and the memory sequencer 22 in a video graphics controller is illustrated. In this architecture, the memory sequencer 22, receives requests for access to the memory architecture depicted in FIG. 2 from the data requesters 20, and arbitrates or assigns priorities to these memory access requests. The memory sequencer 22 then places these data access requests into a FIFO 24 that is coupled to the memory architecture 10 depicted in FIG. 2.

It should be appreciated that the video graphics controller may manipulate pixel data from more than one source. In addition to a video memory, a non-exhaustive list of some of the various sources from which the pixel data may be obtained include, for example, a video capture unit, a video playback unit , a block transfer unit, and a CPU interface. Each of these sources in the video graphics controller, require access to the video memory to either write data to the video memory or to read data from the video memory. It should be appreciated that these are among the clients for whom the memory sequencer determines the priority of access to the memory architecture.

To determine the needs of each of the requesters, the memory sequencer typically tracks data in FIFO memory buffers associated with each of the requesters. Depending upon the amount of data in the FIFO buffers of the requester, and the assigned priorities of each of the requestors, priority among the requestors for access to the video memory is determined dynamically by the memory sequencer. Once the priority has been determined by the memory controller by assessing the relative data needs of each of the clients and considering the assigned priorities of each of the clients, the memory sequencer provides the selected client with a data transfer or memory burst from the video memory.

It should be appreciated that the generalized memory sequencer architecture depicted in FIG. 3 may have additional features that are not disclosed for purposes of not overcomplicating the disclosure. For example, because different groups of some of the data requestors can be related to one another, the most efficient scheme for allocating data access to the video memory may not be to make every data requestor a client of the memory sequencer, but rather to group together different data requesters that are similarly related.

Turning again to FIG. 2, it is contemplated that the DRAM core 12 will be operated in page mode or other mode to provide an efficient transfer of data from the DRAM core 12. The circuits peripheral to the DRAM core 12 and the manner of operating the peripheral circuits of the DRAM core 12 to implement a page mode transfer were discussed extensively in the background section above, though only the row address need be provided to the DRAM core 12. However, in addition to the instructions typically generated by the memory sequencer to provide the address of the page in DRAM core 12, precharge the bitlines in the DRAM core 12, and to read the page in the DRAM core 12 into the sense amps, the memory sequencer must provide instructions to the DRAM core 12 for transferring data from the sense amps into the SRAM 14 and for transferring data from the SRAM 14 into the DRAM core 12. It is contemplated that these additional instructions may be provided to control the DRAM core 12 on a multi-signal command and control bus or as separate signals.

When any of the operations of transferring data from DRAM core 12 to the sense amplifiers, transferring data from the sense amplifiers to the SRAM 14, or transferring data from the SRAM 14 to the DRAM core 12 are being performed a busy signal is provided to the memory sequencer which prevents access the DRAM core 12. It should be appreciated, however, that this busy signal does not prevent the memory sequencer from accessing the SRAM 14 for the memory sequencer data requesters.

According to the preferred embodiment of the present invention, the DRAM core 12 with a system memory clock that cycles the memory at 8 nS and has a memory system reset signal that is applied at power on for at least 128 clock cycles.

In the page wide data transfers between the DRAM core 12 and SRAM 14 described above, namely, the data transfer from the sense amplifiers to the SRAM 14 and the data transfer from SRAM 14 to the DRAM core 12, the memory sequencer additionally provides a read/write core signal (R/W core) and a four bit SRAM address (Addr-core<0:3>) to the SRAM 14. The R/W signal prepares the SRAM 14 for a data transfer with the DRAM core 12, and the Addr-core<0:3> selects one of the sixteen pages as the site for data transfer from the DRAM core 12 or as one of sixteen pages of data for transfer to the DRAM core 12.

In addition to the page wide port for transferring with the DRAM core 12, the SRAM 14 has, in a preferred embodiment, a seventy-two bit wide port for transferring sixty-four bits of data into and out of the SRAM 14 and eight bits of write marks into the SRAM 14. When data is to be transferred into and out of the SRAM 14 under the control of the memory sequencer, the signals read/write bus (R/W bus) and an eight bit SRAM address (Addr bus<0:7>) are employed. The R/W bus signal is HIGH when the data is being read from the SRAM 14, and LOW when data is being written tot eh SRAM 14. Of the eight bits on the Addr bus<0:7>, the upper four bits select the page in the SRAM and the lower fours bit select one of the sixty-four bit quad words in the selected page. The write marks bus<0:7> is only employed during the transfer of data in to the SRAM 14. Each of the words in the SRAM 14 has an associated write mark. The write marks indicate whether the data in that byte should be written into the SRAM 14. When the write mark is '0', the accompanying byte and the write mark are not written into the SRAM 14.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A memory architecture for a video graphics controller comprising:

a dynamic random access memory (DRAM) having a data port, an address decoder that can receive an address to select a memory location in said DRAM, and a command instruction bus that can receive instructions for data transfer;

a static random access memory (SRAM) having a first data port to transfer data with said DRAM, a second data port to transfer data with a plurality of data requesters, a first address decoder that can receive an address to select a memory location in said SRAM for data transfer with said DRAM, a first read/write input that can receive a signal for data transfer with said DRAM, a second address decoder that can receive an address to select a memory location in a page of said SRAM to transfer data to one or more of said plurality of data requestors, and a second read/write input that can receive a signal for data transfers from another of said plurality of data requestors, wherein said SRAM is partitioned into portions, wherein each portion is allocated to a separate data requestor; and a bus coupled between said data port of said DRAM and said first data port of said SRAM for data transfer between said DRAM and said SRAM.

2. A memory architecture for a video graphics controller as in claim 1, wherein said DRAM further includes a reset input.

3. A memory architecture for a video graphics controller as in claim 1, wherein said DRAM further includes a busy output.

4. A memory architecture for a video graphics controller as in claim 1, wherein said second data port of said static random access memory is coupled to a data bus and write marks bus.

5. A memory architecture for a video graphics controller comprising:

a dynamic random access memory (DRAM) having a data port, a plurality of address inputs coupled to an address bus that provides an address to select a memory location in said DRAM, and a plurality of command instruction inputs coupled to a command instruction bus that provides instructions for data transfer;

a static random access memory (SRAM) having a first data port to transfer data with said DRAM, a second data port to transfer data with a plurality of data requestors, a first plurality of address inputs coupled to a first address bus that provides an address to select a memory location in said SRAM for data transfer with said DRAM, a first read/write input that can receive a signal for data transfer with said DRAM, a second plurality of address inputs coupled to a second address bus that provides an address to select a memory location in a page of said SRAM to transfer data to one or more of said plurality of data requesters, and a second read/write input that can receive a signal for data transfers from another of said plurality of data requestors, wherein said SRAM is partitioned into portions, wherein each portion is allocated to a separate data requester; and a bus coupled between said data port of said DRAM and said first data port of said SRAM for data transfer between said DRAM and said SRAM.

6. A memory architecture for a video graphics controller as in claim 5, wherein said DRAM further includes a reset input.

7. A memory architecture for a video graphics controller as in claim 5, wherein said DRAM further includes a busy output.

8. A memory architecture for a video graphics controller as in claim 5, wherein said second data port of said static random access memory is coupled to a data bus and write marks bus.

9. A memory architecture for a video graphics controller comprising:

a dynamic random access memory (DRAM) having a data port, a plurality of address inputs coupled to an address bus that provides an address to select a memory location in said DRAM, and a plurality of command instruction inputs coupled to a command instruction bus that provides instructions for data transfer;

a partitioned static random access memory (SRAM) having a data port to transfer data with said DRAM for selected partitions of said SRAM that have been assigned to predetermined data requestors of said selected partitions, a plurality of address inputs coupled to a first address bus that provides an address to select one of said selected partitions in said SRAM for data transfer with said DRAM, and a read/write input that can receive a signal for data transfer with said DRAM; and a bus coupled between said data port of said DRAM and said data port of said SRAM for data transfer between said DRAM and said SRAM.

10. A memory architecture for a video graphics controller as in claim 9, wherein said DRAM further includes a reset input.

11. A memory architecture for a video graphics controller as in claim 9, wherein said DRAM further includes a busy output.

12. A memory architecture for a video graphics controller comprising:

a dynamic random access memory (DRAM) having a data port, a plurality of address inputs coupled to an address bus that provides an address to select a memory location in said DRAM, and a plurality of command instruction inputs coupled to a command instruction bus that provides instructions for data transfer;

a partitioned static random access memory (SRAM) having a first data port to transfer data with said DRAM, a second data port to transfer with other than said DRAM for selected partitions of said SRAM that have been assigned to predetermined data requestors of said selected partitions, a first plurality of address inputs coupled to a first address bus that provides an address to select a memory location in said SRAM for data transfer with said DRAM, a first read/write input that can receive a signal for data transfer with said DRAM, a second plurality of address inputs coupled to a second address bus that provides an address to select one of said selected partitions in said SRAM for data transfer from other than said DRAM, and a second read/write input that can receive a signal for data transfer from other than said DRAM; and a bus coupled between said data port of said DRAM and said first data port of said SRAM for data transfer between said DRAM and said SRAM.

13. A memory architecture for a video graphics controller as in claim 12, wherein said DRAM further includes a reset input.

14. A memory architecture for a video graphics controller as in claim 12, wherein said DRAM further includes a busy output.

15. A memory architecture for a video graphics controller as in claim 12, wherein said second data port of said static random access memory is coupled to a data bus and write marks bus.

* * * * *